Feb. 28, 1967   R. F. PITMAN ETAL   3,306,373
HOLE DIGGER AND DERRICK APPARATUS
Filed Nov. 28, 1960   4 Sheets-Sheet 1

INVENTORS.
Raymond F. Pitman
Dean E. Broderson
Herbert W. Gronemeyer Jr.
BY Hovey, Schmidt, Johnson & Hovey
ATTORNEYS.

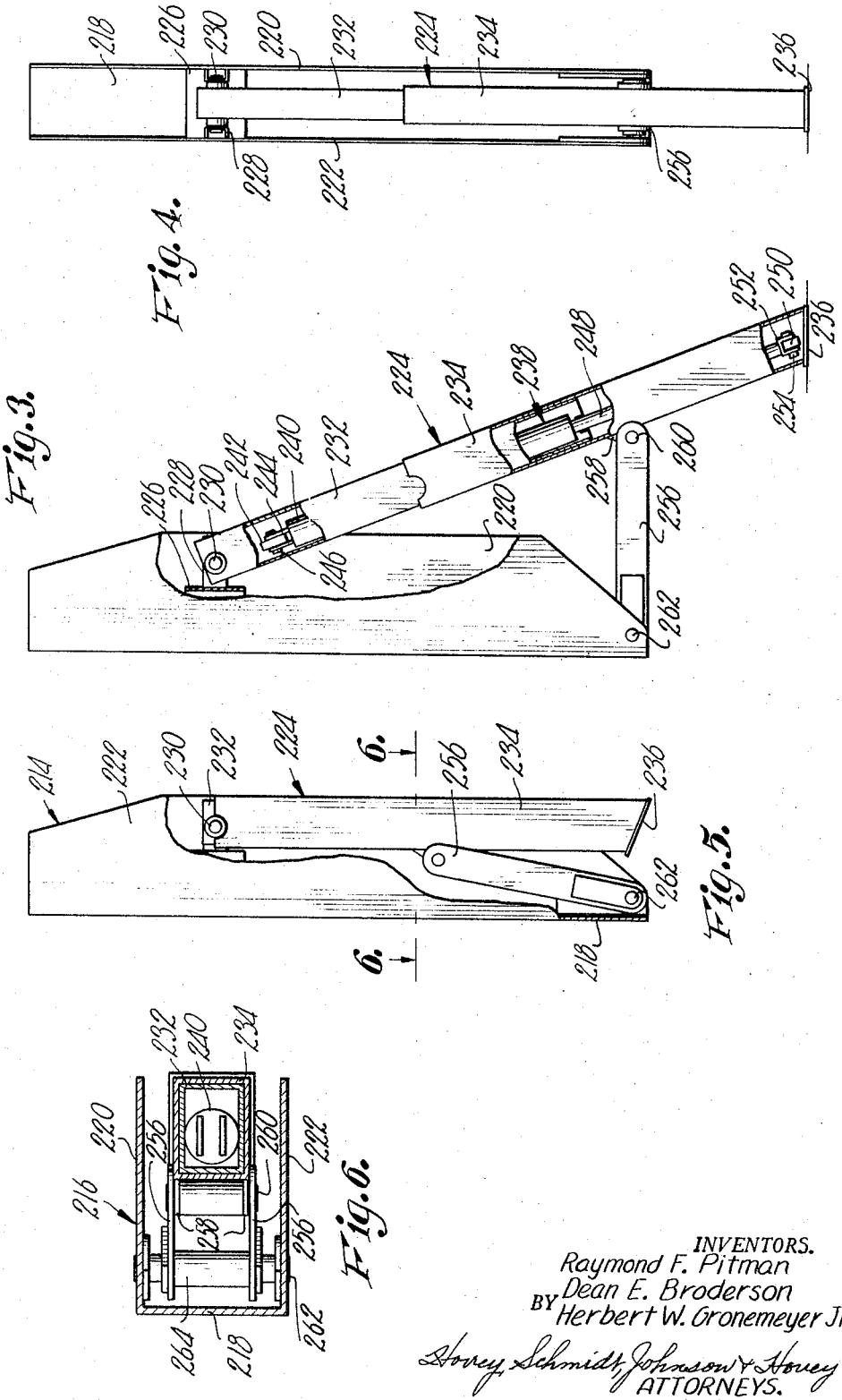

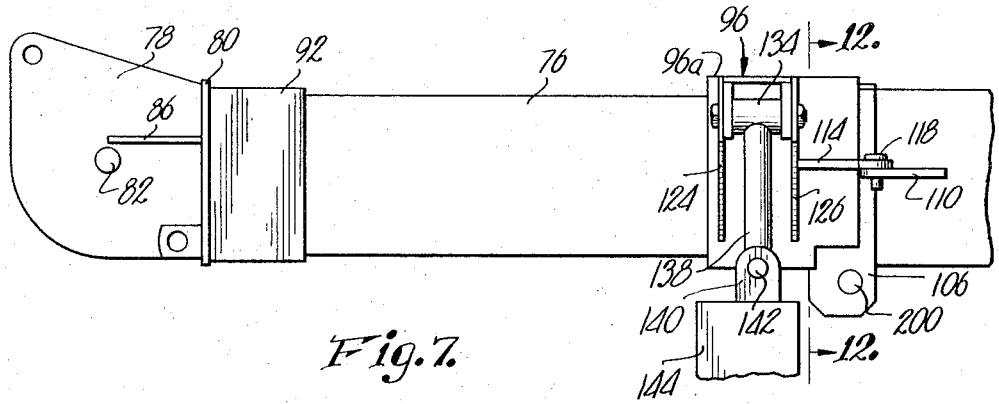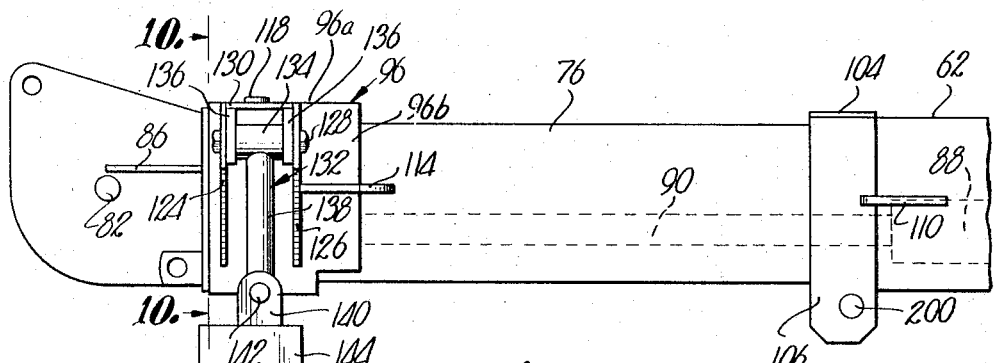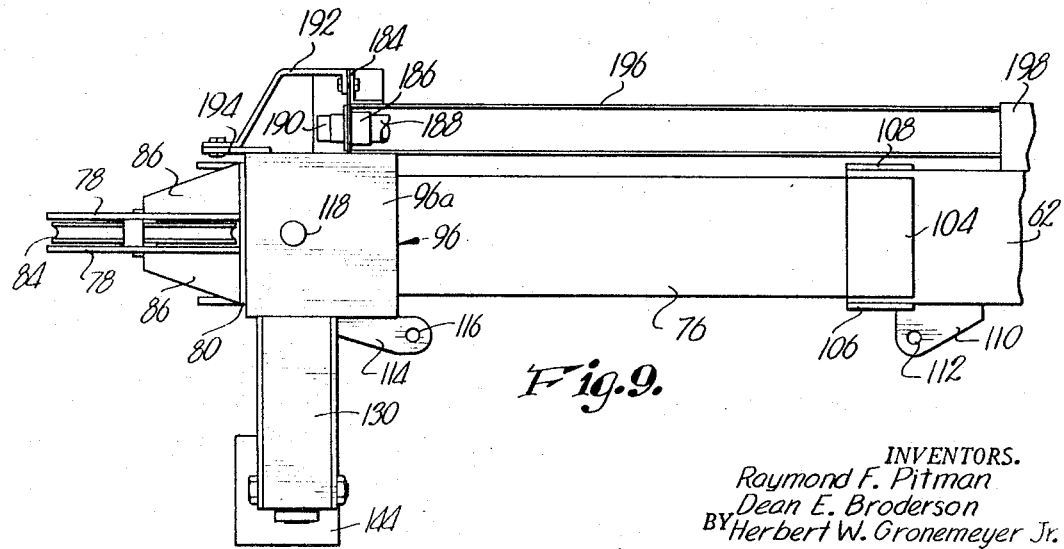

INVENTORS.
Raymond F. Pitman
BY Dean E. Broderson
Herbert W. Gronemeyer Jr.

ATTORNEYS.

United States Patent Office 3,306,373
Patented Feb. 28, 1967

3,306,373
HOLE DIGGER AND DERRICK APPARATUS
Raymond F. Pitman, Prairie Village, Kans., and Dean E. Broderson and Herbert W. Gronemeyer, Jr., Kansas City, Mo., assignors to Pitman Manufacturing Company, Grandview, Mo., a corporation of Missouri
Filed Nov. 28, 1960, Ser. No. 72,027
9 Claims. (Cl. 173—28)

This invention relates to a hoisting unit adapted to be mounted on a mobile vehicle and particularly, to a utility vehicle that combines the functions of a hydraulic digger and a derrick.

It has been common practice among utility companies and the like, to employ several different types of machines for the erection and maintenance of electrical transmission lines with each machine performing its own individual function. For example, it has normally been necessary to have a separate digger unit available at all times so that new poles may be erected in place. The actual digger consisted of an auger which was driven from a power take-off on the vehicle supporting the digger frame. Once the hole was dug, it was necessary to have a crane or derrick available on another vehicle so that the pole could be raised into position an dthen lowered into the freshly prepared hole, and further, to permit elevation of transformers and other types of equipment to the upper end of the pole.

It is apparent that two or more separate vehicles were required in order to properly erect transmission lines and this resulted in the necessity of having a large number of expensive pieces of equipment, tying the same up at one construction site, and causing considerable waste of time because of the necessity of jockeying each of the vehicles into proper position and which, in many instances, was difficult because of the various booms and the like of the equipment getting in the way of each other and the pole being placed in position.

The auger unit for digging holes was particularly difficut to handle in prior machines because of the necessity of moving the truck until the back portion thereof was in direct alignment with the area in which the pole was to be erected. This means that the truck had to be moved a number of times, not only for placing the same in position for a particular hole, but also each time it was desired to dig a number of holes in a relatively small area.

It is, therefore, the primary object of the present invention to overcome the problems set forth above, and to provide a hoisting unit adapted to be mounted on a mobile vehicle, and including components combining the functions of a hydraulic digger, as well as a derrick so that separate vehicles for each component are eliminated and the crew may operate more efficiently in order to erect poles and the like in a minimum of time.

A further important object of the invention is to provide a hoisting unit adapted to be mounted on the defined mobile vehicle which includes a rotatable boom assembly having an extensible boom which carries the power-driven auger for forming the above defined holes with the auger being positionable on any one of the elongated elements making up the extensible boom so that holes may be formed at various distances from the truck. In this respect, it is another significant object of the invention to provide a hoisting unit including an auger assembly as a part thereof, which permits the truck to be positioned on the shoulder of a road or the like, and with the auger being movable across fences, ditches and walls, and into yards, to thereby preclude the necessity of driving the truck into the area in which the hole is to be formed.

A still further aim of the invention is to provide a unit as described, wherein the hole-forming auger is extensible to permit digging of very deep holes, and also allowing holes to be driven of proper depth, even though the ground level at which the hole is to be formed, is substantially below the level of the truck.

A still further important object of the invention is to provide a unit including a power-driven auger, which is shiftably mounted on the extensible boom and provided with components permitting the same to be connected either to the innermost boom element carried by the truck, or the boom element which moves outwardly therefrom, and with selective coupling of the auger to either of the boom elements being accomplished while the auger is in one position thereof.

An additional important aim of the invention is to provide a hoisting unit wherein the derrick portion of the hoisting unit and including the extensible boom, as well as a sheave rotatably mounted on the outermost extremity of the outer boom element, is operable independently of the auger so that it is unnecessary to remove the auger from the machine during the time that the unit is being employed as a derrick, and with the auger being stowed in an out-of-the-way position against the boom during such operations so that the same is not in the way at any time of the workers or the boom itself, during swinging movement thereof.

Also, an object of the instant invention is to provide a unit combining the functions of a hydraulic digger and a derrick which is adapted to be mounted on the rear corner of a vehicle body so that the unit takes up very little of the space available in the truck body, and so that more efficient use can be made of the extensible boom structure inasmuch as the same is located in proximity to the side of the truck which faces away from the highway, and thereby proximal to the area in which the work is to be done with respect to erection of a transmission pole and the components carried thereby. A further important object in this respect is to provide a unit having a novel outrigger assembly thereon which folds up into disposition against the frame of the truck body, and yet which may be readily extended outwardly from the vehicle in direct alignment with the rotatable base assembly of the boom structure to thereby provide support for the latter during utilization of the boom.

An object of the invention is therefore, to provide an outrigger which is operated by a single hydraulic cylinder which functions to not only extend the leg of the outrigger, but to also swing the latter away from the truck into supporting relationship to the boom structure in response to actuation of the cylinder.

A particularly important object of the invention is to provide a hoisting unit as described, wherein the boom carrying the auger, as well as other components, is rotatable through a 360° arc so that holes may be dug in a full circle around the vehicle without moving the latter, and with the auger being positionable so that the holes may be dug either vertically or at an angle with respect to the surface of the ground as required and without the necessity of moving the truck.

A further significant object of the invention is to provide a combination hydraulic digger and derrick unit which is of compact construction and may be folded down into overlying relationship to the truck body so the vehicle can be driven under relatively low underpasses, and with the weight of the hoisting unit being evenly distributed over the truck body to prevent substantial leaning thereof in the absence of the outrigger assembly being in engagement with the ground.

Other important objects and details of construction of the present unit will be described in greater detail or become obvious as the following specification progresses.

In the drawings:

FIG. 3 is a side elevational view of the outrigger assembly per se and with certain parts thereof being broken away and in section to reveal details of construction of the same;

FIG. 4 is a side elevational view of the outrigger as shown in FIG. 3;

FIG. 5 is a side elevational view similar to FIG. 3, but with the extensible leg of the outrigger being in retracted position;

FIG. 6 is an enlarged, horizontal, cross-sectional view taken on line 6—6 of FIG. 5 and looking downwardly;

FIG. 7 is a fragmentary, enlarged, side elevational view of the outer part of the extensible boom structure and illustrating the sleeve means for shiftably mounting the auger on the boom structure;

FIG. 8 is a fragmentary, enlarged, side elevational view of the boom structure similar to that illustrated in FIG. 7, but with the sleeve means for carrying the auger being connected to the outer boom element of the extensible boom structure;

FIG. 9 is a fragmentary, enlarged, plan view of the boom structure as shown in FIG. 8 and with the sleeve means for the auger again being coupled to the outer boom element;

Figure 1:
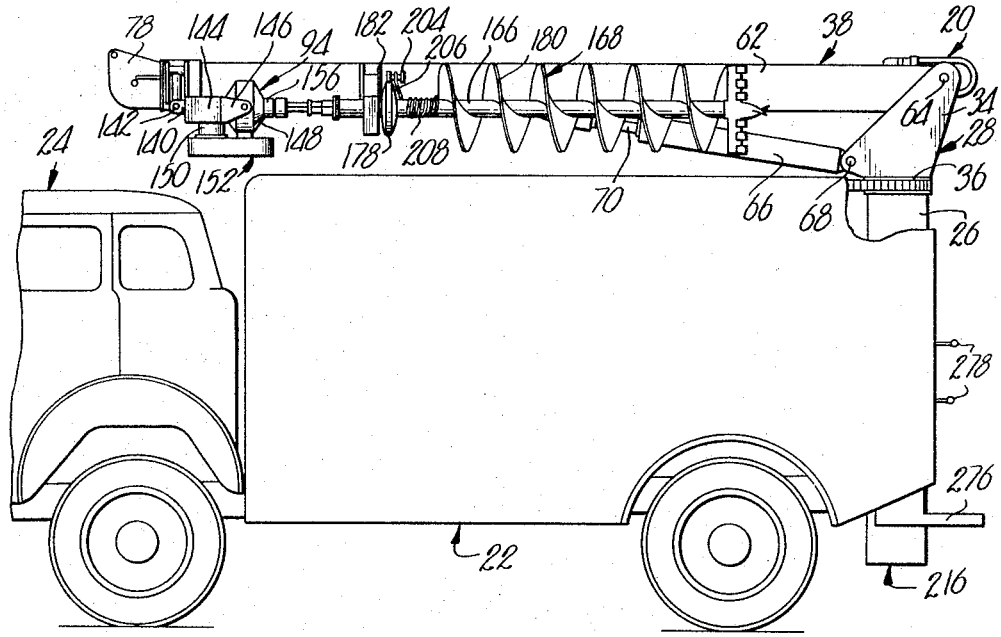
FIGURE 1 is a fragmentary, side elevational view of a line truck having a hoisting unit combining the functions of a hydraulic digger and a derrick mounted on one rear corner of the truck body and shown in the stowed position thereof in direct overlying relationship to the truck, certain parts of the equipment being broken away to reveal details of the elements therebehind.

The combination hydraulic digger and derrick unit broadly designated 20, is adapted to be mounted on the body 22 of a mobile vehicle 24, preferably comprising a line truck or the like. It is to be preferred that unit 20 be mounted on the rear right-hand corner of body 22, and thus includes an upright, tubular support 26 which rotatably carries a base assembly 28 provided with an upright mast (not shown), rotatable about a vertical axis and having a sprocket wheel 30 on the upper end thereof.

Figure 13:
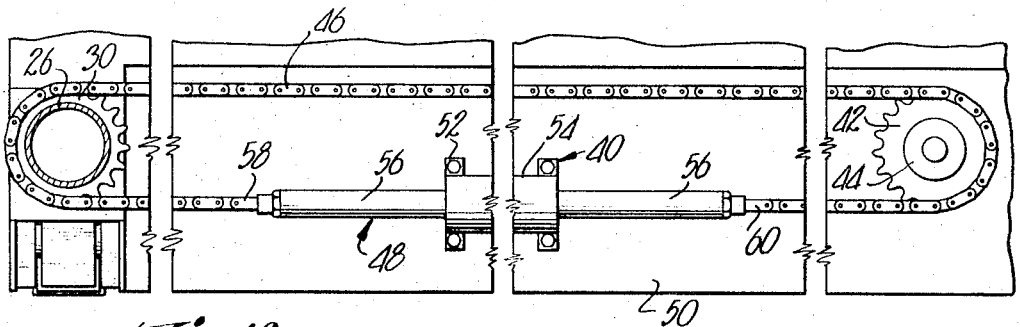
FIG. 13 is a fragmentary, plan view of the power-operated means for swinging the extensible boom through a 360° arc.
Figure 10:
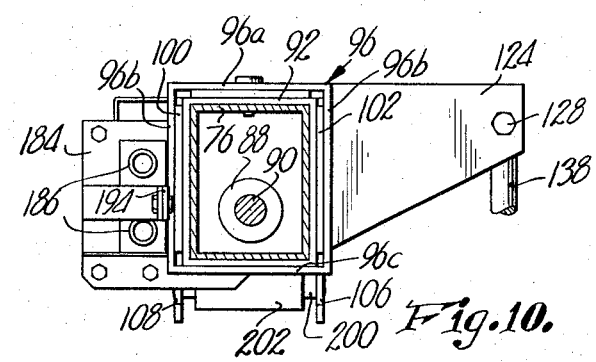
FIG. 10 is a fragmentary, vertical, cross-sectional view taken on line 10—10 of FIG. 8 and looking to the right as indicated by the arrows.
Figure 11:
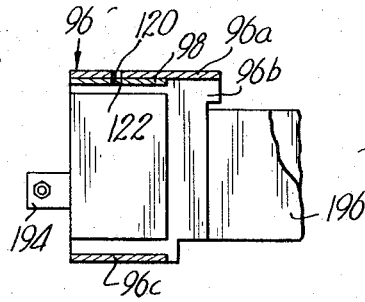
FIG. 11 is a fragmentary, vertical, cross-sectional view through the sleeve means for carrying the auger, and with the boom elements being removed to more clearly show the construction of the sleeve means.

A pair of generally triangular mounting plates 34 carried by a disc 36 secured to sprocket wheel 30, swingably mount extensible boom structure broadly numerated 38. Mechanism 40 for rotating base assembly 28 and thereby boom structure 38 through a 360° arc, includes a sprocket wheel 42 which is mounted on a vertical member 44 for rotation therewith and located on the top of the forward, right-hand corner of truck body 22. Sprocket wheel 42 receives a portion of chain 46 which is also trained around sprocket wheel 30 as shown in FIG. 13. A double-acting cylinder assembly 48 mounted on the upper wall 50 of the right-hand portion of truck body 22 between sprockets 30 and 42, through bracket means 52, includes a cylinder 54 having a shiftable piston therein and reciprocably receiving an elongated piston rod 56 secured to each side of the piston and projecting outwardly from each end of cylinder 54. Referring to FIG. 13, it is to be noted that opposed ends 58 and 60 of chain 46, are secured to respective ends of piston rod 56, so that as the piston is reciprocated in cylinder 54, chain 46 is moved to rotate sprocket wheels 30 and 42.

Boom structrue 38 includes an inner tubular boom element 62 pivotally carried by base assembly 28 by virtue of pin means 64 extending through the innermost extremity of element 62 and the upper ends of opposed plates 34. In order to effect vertical swinging movement of boom structure 38 relative to base assembly 28, a hydraulic cylinder 66 is pivotally connected to the lower ends of plates 34 by pin means 68, while the piston rod 70 of cylinder 66 is pivotally joined to bracket 72 on the underface of boom element 62 by pin means 74. It can be seen that extension and retraction of piston rod 70, with respect to cylinder 66, causes boom structure 38 to be pivoted about the horizontal axis of pin means 64.

Telescoped into tubular boom element 62, is an elongated, outer boom element (or "stinger" as it is sometimes called) 76 of tubular configuration complemental with boom element 62, and with the same preferably being of rectangular construction and formed from an electrically nonconducting material. A pair of outwardly projecting sheave plates 78 secured to a mounting plate 80 on the outermost extremity of boom element 76, receives a cross pin 82 which rotatably supports a sheave 84 which is adapted to carry a hoisting rope thereover. Triangular gussets 86 extend between plate 80 and plates 78 to reinforce the latter.

In order to provide relative movement between boom elements 62 and 76, a piston and cylinder assembly is provided within boom structure 38 with the cylinder 88 being connected to the side walls of boom element 62, while the piston 90 is joined to boom element 76. Extension and retraction of piston 90 causes shifting of boom element 76 into and out of boom element 62.

A spacer collar 92 of rectangular configuration is secured to the outer end of boom element 76 in complemental engagement therewith and in abutting relationship to the end plate 80 thereon. The auger assembly, broadly designated 94, includes a transversely rectangular bracket 96 having a spacer plate 98 secured to the underface of the top wall 96a, as well as a pair of opposed side plate 100 and 102 welded to opposed side walls 96b of bracket 96. The inner faces of plates 98, 100 and 102, engage the outer opposed surfaces of collar support 92 when bracket 96 is in engagement with wall plate 80. Plate 98, as well as the lower wall segment 96c of bracket 96, terminate in spaced relationship to the normally rearmost upright margin of bracket 96 to permit the latter to telescope over a rectangular upper plate 104 secured to the upper surface of boom element 62 at the outermost extremity thereof remote from base assembly 28, as well as a pair of elongated, upright plates 106 and 108 which are in direct alignment with plate 104 and project downwardly below the lower surface of boom element 62 (see FIGS. 7 and 8).

A lug 110, secured to the side wall of boom element 62 and to mounting plate 106 on the rearmost portion of the latter, is provided with an opening 112 therein with lug 110 being in direct underlying relationship to an outwardly extending lug 114 welded to the outer face of the proximal side wall 96b of bracket 96. As shown in FIGS. 7 and 9, lug 114 is provided with an opening 116 therein which is in direct alignment with opening 112 when bracket 96 overlies plates 104 and 106, whereby a connector pin 118 may be placed in aligned openings 112 and 116 to prevent relative movement between bracket 96 and the boom element 62. Top wall 96a of bracket 96, as well as plate 98, are provided with aligned openings 120 and 122 respectively, which are in alignment with an opening (not shown) in collar 92, as well as the upper wall of boom element 76 for alternately receiving the connector pin 118, as indicated in FIG. 8.

A pair of generally trapezoidal bracket arms 124 and 126, secured to and projecting outwardly from the side wall 96b of bracket 96, mounting lug 114, serve as means for mounting bolt and nut means 128 spanning the distance therebetween, with bracket arms 124 and 126 being maintained in parallel relationship by a top rectangular spacer plate 130 secured thereto.

An I-shaped coupling 132 having an upper sleeve portion 134 rotatable on bolt and nut means 128, and maintained in a central position between bracket arms 124 and 126 by spacers 136 at opposite ends thereof, also includes a downwardly extending, integral arm 138 which has a sleeve (not shown) on the lower extremity thereof, which is positioned between and pivotally coupled to a pair of upstanding ears 140 by pivot means 142. Ears 140 are connected to a rectangular bracket 144 which has a pair of downwardly directed, parallel ears 146 which receive a gear box 148 therebetween. Hydraulic motor 150, mounted within bracket 144, is coupled to gear box 148 through connector mechanism broadly designated 152 and also serving to support motor 150. The output shaft 154 (FIG. 14) of gear box 148 is of polygonal, transverse configuration and is rotatable in the lower sheave portion 156 of gear box 148.

Figure 14:
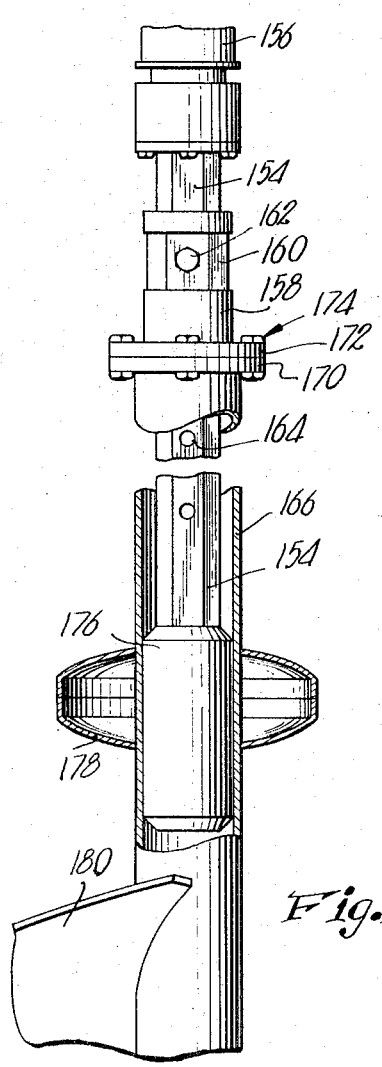
FIG. 14 is an enlarged, fragmentary view of the central portion of the auger and with components thereof being broken away and in section to better illustrate the construction of the same.

A flange unit 158 reciprocable on shaft 154, has a polygonal section 160 provided with a central passage therethrough complementally receiving shaft 154, and section 160 is provided with an opening therein for receiving a connector bolt 162 which can be inserted into any one of a number of holes 164 extending transversely through shaft 154 in positions to be aligned with bolt 162. The tubular shaft or member 166 of the auger, broadly designated 168, has a flange 170 on the upper extremity thereof which is secured to the flange 172 of unit 158 by bolt and nut means 174. As shown in FIG. 14, tubular member 166 is of somewhat greater diameter than shaft 154, so that the latter is free to rotate in member 166. An enlarged, cylindrical segment 176, is integral with the lowermost extremity of shaft 154 and is of a diameter to complentally engage the inner side wall of member 166. It is to be noted that segment 176 operates as a safety stop to prevent displacement of tubular member 166 from shaft 154 by virtue of segment 176 engaging flange unit 158 if auger 168 is permitted to shift downwardly along the length of shaft 154 to the point of engagement of segment 176 with unit 158. A transversely, generally oval-shaped element 178 is secured to the outer surface of member 166 in circumferentially extending relationship thereto and immediately above the auger flight 180 mounted on, and secured to, the outer surface of member 166.

In order that auger 168 may be stowed in generally parallel relationship to boom structure 38, a bracket 182 is secured to the proximal side wall of boom element 62, and is provided with a recess therein for receiving member 166.

Bracket 96 is provided with an outwardly extending plate 184 projecting in the direction opposite to that of bracket arms 124 and 126, and serving as means for mounting a pair of hydraulic coupling connectors 186 which are joined to flexible hydraulic lines 188. The flexible lines 190 couple connectors 186 to hydraulic motor 150 for driving the latter. A bracket arm 192 secured to plate 184 and to a lug 194, extending outwardly from sleeve 96, maintains plate 184 in proper disposition. An elongated, upwardly facing, U-shaped tray 196, connected to the rear face of plate 184, as well as to the outer surface of side wall 96b of bracket 96 proximal to couplings 186, is telescoped into a generally U-shaped protective panel 198 mounted on the outer face of boom element 62 with tray 196 and panel 198 serving to receive the flexible hydraulic lines 188 which lead from the interior of boom structure 38 to the motor 150 as described.

Figure 12:
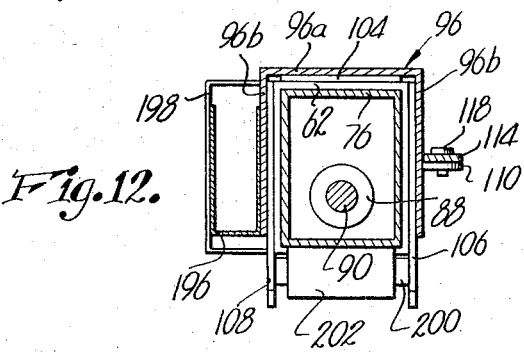
FIG. 12 is a fragmentary, vertical, cross-sectional view taken on line 12—12 of FIG. 7 and looking in the direction of the arrows.

In order that boom element 76 may shift freely with respect to boom element 62, the lower most portions of plates 106 and 108 projecting downwardly from boom element 62, carry a crosspin 200 (FIGS. 8 and 12) which in turn receives a roller 202 disposed to engage the lower face of boom element 76 in supporting relationship to the latter.

Figure 2:
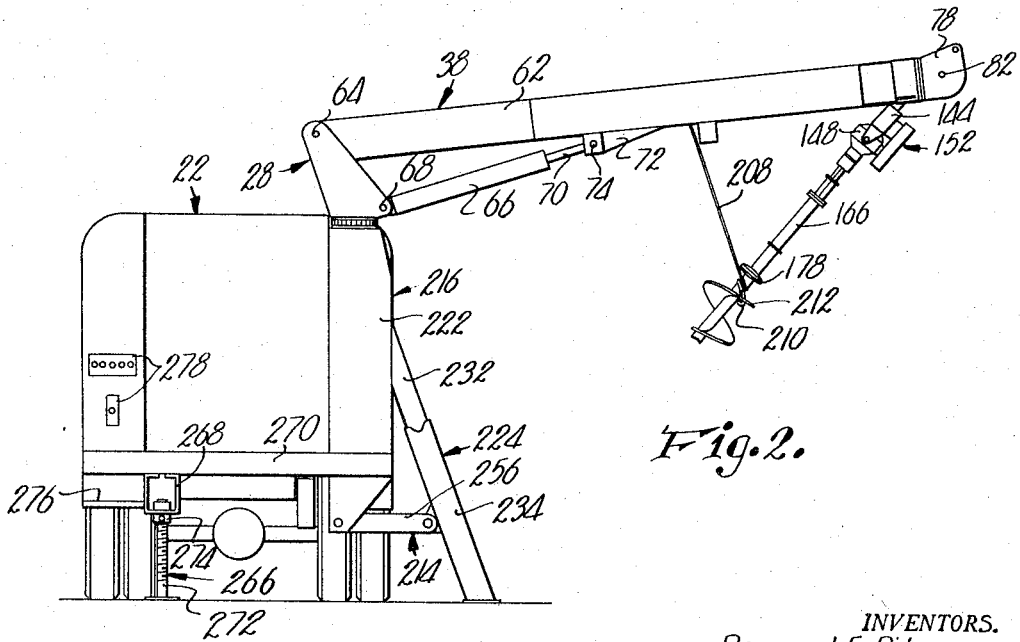
FIG. 2 is a rear elevational view on reduced scale of the vehicle, shown in FIG. 1 and illustrating the position of the boom when projecting outwardly from the truck frame, the location of the outrigger assembly in extended condition, and the way in which the auger is moved to the operable position thereof from the stowed disposition of the same as shown in FIG. 1.

In order to permit swinging of auger 168 into the stowed position thereof engaging bracket 182, a coupling 204 is secured to boom element 62 adjacent bracket 182 for receiving the hook 206 of an elongated cable having a hook 210 at the opposite end thereof adapted to be secured to the extremity 212 of auger flight 180. As shown in FIG. 2, when auger 168 is rotated while hook 210 is secured to flight 180 and the hook 206 to connector 204 respectively, the cable 208 is wound around member 166 below element 178, thereby causing auger 168 to be swung toward boom element 62 about the axis of pin means 142.

An outrigger assembly, broadly designated 214, is mounted on the right-hand rear corner of body 22 in direct alignment with unit 20, and includes an upright housing 216 which is of generally outwardly-facing, U-shaped configuration provided with a vertical rear wall 218 and a pair of opposed side walls 220 and 222 presenting a space therebetween for receiving the extensible outrigger leg 224 as shown in FIG. 5. A bracket unit 226 mounted within housing 216 adjacent the upper end thereof, mounts connector means 228, in turn carrying a horizontal pin 230 rotatably receiving the upper extremity of a tubular, transversely rectangular leg section 232 forming a part of extensible leg 224. The lower-most leg section 234 telescoped over and complemental with section 232, is beveled at the lower extremity thereof and receives a bearing plate 236 which is disposed to complementally engage the ground when extensible leg 224 is in the extended position thereof as shown in FIG. 3. A hydraulic cylinder assembly 238 within extensible leg 224, is provided with a cylinder 240 connected to cross member 242 within section 232 adjacent the upper end thereof, by ear means 244 secured to cross member 242 by pin means 246. The piston 248 of assembly 238 is joined to a cross member 250 at the lower extremity of section 234 by U-coupling 252 connected to cross member 250 by pin means 254.

A pair of parallel links 256 are pivotally joined to lugs 258 secured to the normally rearmost face of section 234 intermediate the ends thereof, by pin means 260, while the opposite ends of the links 256 are swingably connected to the lower ends of corresponding side walls 220 and 222 of housing 216 by pin means 262. A sleeve 264 surrounding pin means 262, interposed between links 256 and secured to the latter, maintains the same in proper spaced relationship.

An additional support may be provided for body 22 during operation of boom structure 38, and the same preferably includes hydraulically operated jack means 266 which includes a bracket 268 secured to the frame 270 of body 22, as well as a vertically shiftable ground-engaging member 272 and movable in response to control means forming a part of the hydraulic system of vehicle 24. The opposite side jack 266 provides stability for boom structure 38 during cross-body operation thereof.

A horizontal step 276 located at the left rear corner of body 22, permits the operator of boom structure 38 to have ready access to the controls 278 for the hydraulic components of unit 20, and outrigger assembly 210, as well as jack means 266, and in a position where he can see the disposition of all of the parts of boom structure 38.

Operation

Vehicle 24 is driven onto the shoulder of the road adjacent the point where it is desired to dig a hole for receiving a utility pole or similar article, and the operator climbs up on step 276 so that he may operate the controls 278. Initially, the control for assembly 238 is operated to thereby cause hydraulic fluid to be directed into cylinder 240 in a direction to force piston 248 outwardly. Extension of piston 248 moves section 234 outwardly with respect to section 232, whereby the links 256 force leg 224 away from and out of housing 216 with the plate 236 moving into engagement with the ground when links 256 are in a substantially horizontal plane.

Next, the control 278 corresponding to cylinder 66, is actuated to thereby cause hydraulic fluid to be directed into cylinder 66 in a direction to extend piston rod 70 and thereby effect swinging movement of boom structure 38 upwardly about the axis of pivot means 64. After boom structure 38 is raised through a predetermined relatively short arc, the control 278, which corresponds to cylinder assembly 48, is actuated in a direction to cause hydraulic fluid to be introduced into cylinder 54, to thereby shift piston rod 56 in either direction thereof.

Assuming that it is desired to rotate sprocket wheel 30 in a clockwise direction and thereby swinging boom structure 38 away from body 22 of vehicle 24, the piston rod 56 is caused to shift to the left, viewing FIG. 13, whereby chain 46 rotates sprocket wheels 42 and 30 in the desired clockwise direction. When boom structure 38 has been swung away from line truck 24, through a predetermined arc, the controls 278 for operating cylinder assembly 48, are de-activated.

The auger 168 is then lowered from the stowed position thereof by removing the securing pin from bracket 182, whereby auger 168 may be spooled downwardly by operating hydraulic motor 150 to rotate member 166 in a direction to unwind cable 208. As soon as the auger 168 has been lowered to disposition permitting disconnection of hook 210 from flight 180, the cable 208 is removed from auger 168 and hook 210 is connected to coupling 204.

If it is necessary that auger 168 be moved to a position in further spaced relationship to vehicle 24, this may be readily accomplished by disposing connector pin 118 in openings 120 and 122, as well as the aligned openings in collar 92 and the outer extremity of boom element 76, whereby upon actuation of the control 278 connected to cylinder 88, the piston 90 is forced outwardly therefrom in a manner to shift boom element 76 outwardly with respect to boom element 62. Since the connector pin 118 couples bracket 96 and thereby, the auger 168 carried by the same to boom element 76, outward movement of the latter shifts auger 168 into the desired disposition for digging purposes.

The control 278 for cylinder 66 is again actuated to thereby lower boom structure 38 as piston rod 70 is retracted into cylinder 66, and with motor 150 being actuated to effect rotation of member 166 in a direction to cause the flights 180 to remove earth from the ground during downward movement of auger 168. As soon as the hole has been dug to a predetermined depth by auger 168, the control 278 for cylinder 66 is reversed, to thereby lift the auger 168 from the freshly dug hole in response to extension of piston rod 70 from cylinder 66.

Additional holes may be dug in the ground in proximity to the hole previously dug and described above by simply extending or retracting boom element 76 to a predetermined extent followed by raising and lowering of boom structure 38 in conjunction with rotation thereof about a vertical axis through support 26 if such swinging movement is required.

A hole may be dug with auger 168 while the latter is connected to the outer extremity of boom element 62 if desired, by simply shifting the connector pin 118 to disposition through aligned openings 112 and 116 in lugs 110 and 114 respectively. It can be seen that when the boom element 76 is returned to the innermost end of its path of travel in telescoped relationship to boom element 62, the lugs 114 and 110 are in overlapping relationship with the openings 116 and 112 respectively in alignment for receiving the connector 118.

During the shifting movement of bracket 96 and thereby auger 168 with respect to boom element 62, the flexible hydraulic lines 188 are carried by tray 196 so that the lines remain out of the way throughout operation of the auger 168 regardless of the position thereof.

Another important feature of auger 168 is the extensibility of the latter which may be accomplished by removing bolt 162 from one of the openings 164 in shaft 154 followed by shifting of member 166 longitudinally of shaft 154, until the opening for receiving bolt 162 is in alignment with another of the openings 164 whereupon the bolt 162 is replaced to interconnect shaft 154 and member 166. This feature is of special importance where it is desired to dig a hole in an area which is at a substantially lower area than the point at which truck 24 is supported by the ground. Also, the extensibility of auger 168 permits holes of varying depth to be dug as required for a particular transmission pole which is being erected.

It should also be pointed out that the sheave 84 may be operated independently of auger 168 through a suitable winch (not shown) provided on body 22 of vehicle 24, and with the line passing downwardly through suitable passages in the boom structure 38. It can be perceived that holes may be drilled in the ground with unit 20, and various components may be lifted to the upper extremity of the newly erected pole utilizing the same apparatus and without the necessity of employing separate units which not only increases the cost of the operation by virtue of the additional equipment required, but also slows down the construction job by virtue of the various pieces of equipment getting in the way of each other.

After the pole has been erected into place and the necessary components connected thereto, the vehicle 24 is ready to be moved to another position and which can be accomplished by simply spooling auger 168 into the stowed position thereof as shown in FIG. 1 and employing cable 208, whereupon the securing pin is reinserted in bracket 182 and boom structure 38 returned to the location thereof pointing forwardly across body 22 in diagonal relationship thereto. The outrigger assembly is retracted by shifting piston rod 248 of cylinder assembly 238 inwardly into cylinder 240, whereby section 234 telescopes over section 232 to effect swinging of leg 224 into the housing 216 as links 256 are caused to swing upwardly into the location thereof illustrated in FIG. 5.

An especially important advantage of the present outrigger assembly is the disposition of cylinder 240 within tubular leg sections 232 and 234 so that rod 248, as well as the couplings at opposed ends of cylinder 240, are protected at all times against objects striking the same. The present construction virtually eliminates problems associated with damage to the outrigger piston and cylinder unit because of poles and other objects striking the outrigger during operation of the hoisting derrick forming a part of the present mechanism.

Having thus described the invention what is claimed as new and desired to be secured by Letters Patent is:

1. In a hoisting unit adapted to be mounted on a mobile vehicle, a rotatable base assembly; extensible boom structure carried by said assembly and provided with a plurality of relatively longitudinally shiftable boom elements; tool means; and means mounting the tool means on the boom structure and including selectively engageable components for releasably securing the tool means to any selected boom for movement relative to the remaining boom elements.

2. In a hoisting unit adapted to be mounted on a mobile vehicle, a rotatable base assembly; extensible boom structure carried by said assembly and provided with a plurality of relatively longitudinally shiftable boom elements; power operated tool means; means mounting the tool means on the boom structure and including selectively engageable components for releasably coupling the tool means to any selected boom element for movement relative to the remaining boom elements; and means operably coupled to said tool means for supplying power thereto in all positions of the same on said structure.

3. In a hoisting unit adapted to be mounted on a mobile vehicle, a rotatable base assembly; extensible boom structure carried by said assembly and provided with a plurality of relatively longitudinally shiftable boom elements; tool means; and means mounting the tool means on said structure including selectively engageable means for releasably coupling the tool means to any selected boom element in disposition permitting relative movement between said boom elements.

4. In a hoisting unit adapted to be mounted on a mobile vehicle, a base assembly rotatable about a vertical axis; extensible boom structure carried by said assembly and provided with a plurality of relatively telescoped boom elements; power means connected to said elements for shifting the latter relatively to effect extension and retraction of the structure; power operated tool means; means mounting the tool means on said structure including selectively operable means for releasably securing the tool means to any selected boom element for movement relative to the remaining boom elements; and means operably coupled to said tool means and carried by said structure for supplying power to said tool means in all positions of the same on said structure.

5. In a hoisting unit adapted to be mounted on a mobile vehicle, a rotatable base assembly; extensible boom structure carried by said assembly and provided with a plurality of relatively longitudinally shiftable boom elements; tool means; and means mounting the tool means on said structure including selectively operable, mutually engageable means on said tool means and each of the boom elements providing releasable connection of the tool means to either of a pair of adjacent boom elements when the tool means is in a predetermined position.

6. In a hoisting unit adapted to be mounted on a mobile vehicle, a rotatable base assembly; extensible boom structure carried by said assembly and provided with a pair of relatively shiftable boom elements, one of said boom elements being longitudinally shiftable toward and away from the base assembly to permit extension and retraction of the boom structure; tool means; and selectively operable means for releasably securing said tool means to the outer portion of either of said boom elements.

7. A hoisting unit as set forth in claim 6 wherein said one boom element is constructed of electrically nonconductive material.

8. A hoisting unit as set forth in claim 6 wherein said selective securing means includes a bracket disposed in spaced relation to said one boom element during the shiftable movement thereof.

9. A hoisting unit as set forth in claim 8 wherein said selective securing means includes lug means carried by said bracket and said other boom element, and fastening means for interconnecting said lug means to thereby secure said bracket to said other boom element, said bracket and said one boom element each having an opening therein, said openings being in alignment when said bracket is on said one element, and including means receivable within said openings when the same are aligned for interconnecting said bracket and said one boom element.

References Cited by the Examiner
UNITED STATES PATENTS

| | | | |
|---|---|---|---|
| 859,031 | 7/1907 | Abel | 212—55 |
| 1,663,833 | 3/1928 | Genung | 175—184 |
| 1,904,249 | 4/1933 | Powell, et al. | 175—201 |
| 2,385,946 | 10/1945 | Schorer | 175—127 |
| 2,456,056 | 12/1948 | Fellay et al. | 175—201 |
| 2,557,637 | 6/1951 | Danuser | 173—38 |
| 2,581,667 | 1/1952 | Joy | 175—201 |
| 2,614,805 | 10/1952 | Swan | 175—183 |
| 2,752,121 | 6/1956 | Marcotte | 175—195 |
| 2,754,087 | 7/1956 | Johnson | 175—201 |
| 2,777,586 | 1/1957 | Boysen et al. | 212—145 |
| 2,849,212 | 8/1958 | Robbins | 175—184 |
| 2,956,782 | 10/1960 | Mistrot | 175—129 |
| 2,959,398 | 11/1960 | Troche | 175—201 |
| 3,021,015 | 2/1962 | Bowman | 212—145 |
| 3,064,825 | 11/1962 | Thomas | 212—145 |
| 3,073,397 | 1/1963 | Balogh | 175—201 |
| 3,073,455 | 1/1963 | Eckels et al. | 173—28 |
| 3,244,239 | 4/1966 | Balogh et al. | 173—28 |

FRED C. MATTERN, Jr., *Primary Examiner.*

BENJAMIN BENDETT, ERNEST A. FALLER,
*Examiners.*

D. FAULCONER, L. P. KESSLER, *Assistant Examiners.*